A. T. ASHTON.
SPRING FRAME FOR MOTOR CYCLES.
APPLICATION FILED MAR. 28, 1918.

1,283,030.

Patented Oct. 29, 1918.

Inventor
A. L. Ashton

UNITED STATES PATENT OFFICE.

AMASA T. ASHTON, OF BUTLER, NEW JERSEY.

SPRING-FRAME FOR MOTOR-CYCLES.

1,283,030.  Specification of Letters Patent.  Patented Oct. 29, 1918.

Application filed March 28, 1918. Serial No. 225,262.

*To all whom it may concern:*

Be it known that I, AMASA T. ASHTON, a citizen of the United States, residing at Butler, in the county of Morris, State of New Jersey, have invented certain new and useful Improvements in Spring-Frames for Motor-Cycles; and I do hereby declare the following to be a full, clear, and exact description of the invention, such as will enable others skilled in the art to which it appertains to make and use the same.

The invention relates to a motor or bicycle frame, and more particularly to the class of spring frames for motorcycles, bicycles or the like.

The primary object of the invention is the provision of a cycle frame of this character wherein all shocks and jars incident to the use of the cycle will be absorbed, thereby assuring to the rider comfort and ease without being subjected to sudden jars or shocks in the use of the cycle.

Another object of the invention is the provision of a frame of this character wherein the motion thereof is an underslung action, the frame being of novel form to possess the required resiliency, and at the same time will be strong and durable.

A further object of the invention is the provision of a frame of this character which is comparatively simple in construction, thoroughly reliable and efficient in its purpose, and inexpensive to manufacture.

With these and other objects in view, the invention consists in the features of construction, combination and arrangement of parts as will be hereinafter fully described, illustrated in the accompanying drawing, and pointed out in the claims hereunto appended.

In the accompanying drawing.

Similar reference characters indicate corresponding parts throughout the several views in the drawing.

Figure 1:
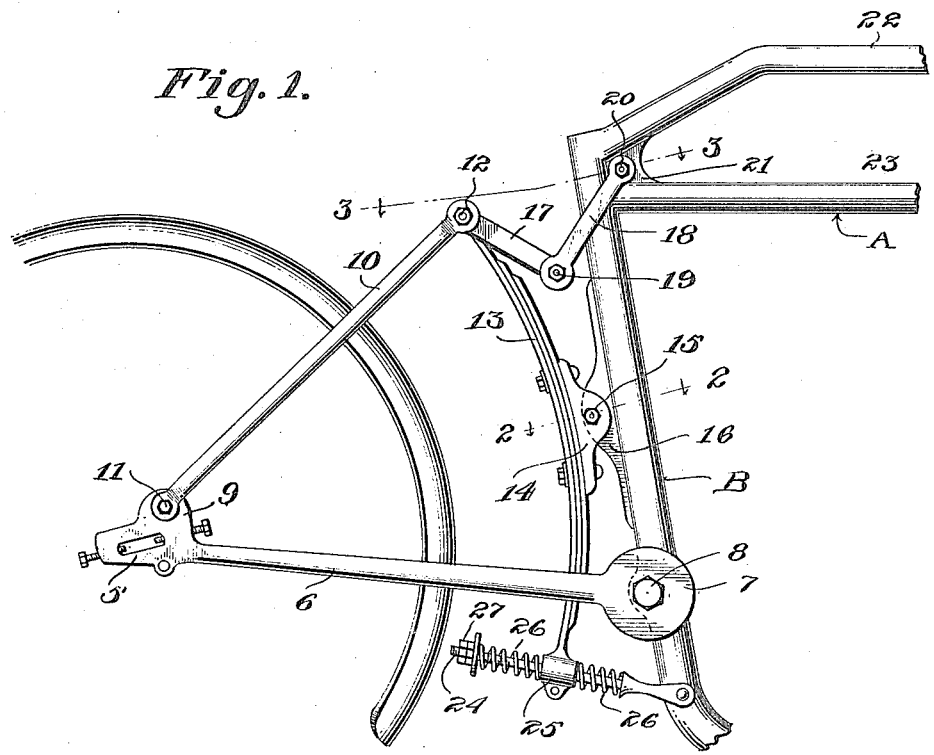
Figure 1 is a view in side elevation of a portion of the cycle frame constructed in accordance with the invention.
Figures 2, 3:
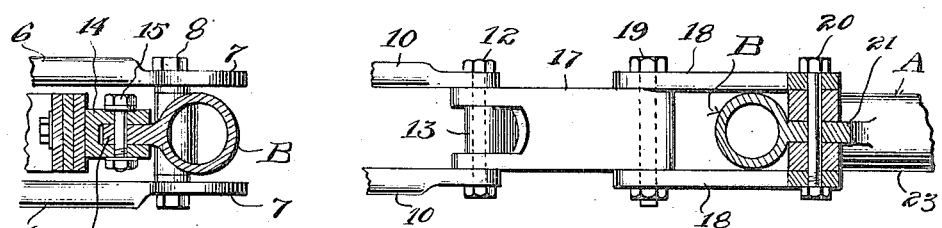
Fig. 2 is a sectional view on the line 2—2 of Fig. 1.
Fig. 3 is a detail plan view showing the parts in the vicinity of the line marked 3—3 in Fig. 1.
Figure 4:
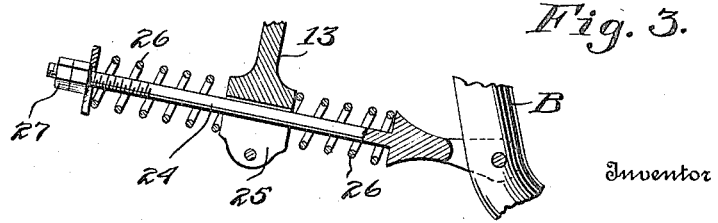
Fig. 4 is a fragmentary vertical sectional elevation.

Referring to the drawing in detail, A designates generally a portion of the motor or bicycle frame which is of any ordinary well known construction having the seat post tube B of the construction shown. The rear frame section includes the usual rear bearings 5 formed on the rear ends of laterally spaced arms 6 formed at their front ends with pivot heads 7 through which is centrally passed a transverse pivot bolt 8 journaled in a suitable bearing formed on the seat post tube B for the swinging of the arms 6 as will be hereinafter fully described.

The bearings 5 of the rear fork for the rear wheel of the motor or bicycle has formed thereon upstanding ears 9 to which are pivoted the rearwardly inclined laterally spaced upper arms 10, the lower end of each being engaged upon the pivot 11 which is carried in the ear 9 while the upper ends of said arms 10 carry a cross pivot 12 with which is engaged a bowed multiple ply leaf spring 13 which carries intermediate thereof a rocker bearing 14 engaged upon a pivot 15 in a stationary bearing 16 formed on the seat post tube B.

Also pivotally connected to the pivot 12 is a break jointed link connection including the links 17 and 18 respectively which are pivoted at 19 together forming the break joint therein, the links 18 being engaged upon a pivot 20 mounted in a web 21 formed between the upper and lower horizontal bars 22 and 23 respectively of the machine frame.

Below the arms 6 and pivoted to the seat post tube B is an equalizer comprising a bolt member 24 slidably engaged in a sleeve or collar terminal 25 formed on the lower end of the spring 13 and surrounding this bolt member 24 at opposite sides of the sleeve or collar 25 are equalizing springs 26 the same being tensioned under the action of an adjusting nut 27 threaded on the bolt member 24 which can be manually adjusted to vary the tension of the springs 26, as will be apparent.

In the operation of the frame of the motor or bicycle when an obstruction or irregularity in the ground causes shock or jar to be imparted thereto the frame will yield in an underslung movement and the shock or jar will be absorbed thereby, thus assuring comfort and ease of the rider without being subjected to undue and sudden shocks or jars in the use of the motor or bicycle.

From the foregoing it is thought that the construction and manner of operation of the invention will be clearly understood, and therefore a more extended explanation has been omitted.

What is claimed is:

1. In a cycle frame, the combination with lower and inclined upper rear frame arms, of bearings formed on the lower arms and pivoted to the upper arms, a main frame pivotally connected to the lower arms, a rocking leaf spring carried by the main frame and connected with the upper arms, a break link connected between the upper arms and the main frame, and an equalizing device carried by the main frame and connected with the leaf spring.

2. In a cycle frame, the combination with lower and inclined upper rear frame arms, of bearings formed on the lower arms and pivoted to the upper arms, a main frame pivotally connected to the lower arms, a rocking leaf spring carried by the main frame and connected with the upper arms, a break link connection between the upper arms and the main frame, an equalizing device carried by the main frame and connected with the leaf spring, and means for varying the tension of the equalizing device.

3. In a cycle frame, the combination with a main frame, of lower arms pivoted thereto and extending rearwardly therefrom, upper arms pivoted to the lower arms, a bowed leaf spring connected with the main frame for rocking movement and having one end connected with the upper arms, a break joint connection between the upper arms and said main frame, and means connecting the lower end of the spring with the frame and having equalizing springs coacting with said leaf spring.

4. In a cycle frame, the combination with a main frame, of lower arms pivoted thereto and extending rearwardly therefrom, upper arms pivoted to the lower arms, a bowed leaf spring connected with the main frame for rocking movement and having one end connected with the upper arms, a break joint connection between the upper arms and said main frame, means connecting the lower end of the spring with the frame and having equalizing springs coacting with said leaf spring, and means for varying the tension of the equalizing device.

In testimony whereof, I affix my signature, in the presence of two witnesses.

AMASA T. ASHTON.

Witnesses:
GEORGE WECKBACH,
FRANCIS H. McCUE.

Copies of this patent may be obtained for five cents each, by addressing the "Commissioner of Patents, Washington, D. C."